H. F. CUNNING.
PRESSURE REGULATING VALVE.
APPLICATION FILED FEB. 15, 1909.
937,774.
Patented Oct. 26, 1909.
3 SHEETS—SHEET 1.
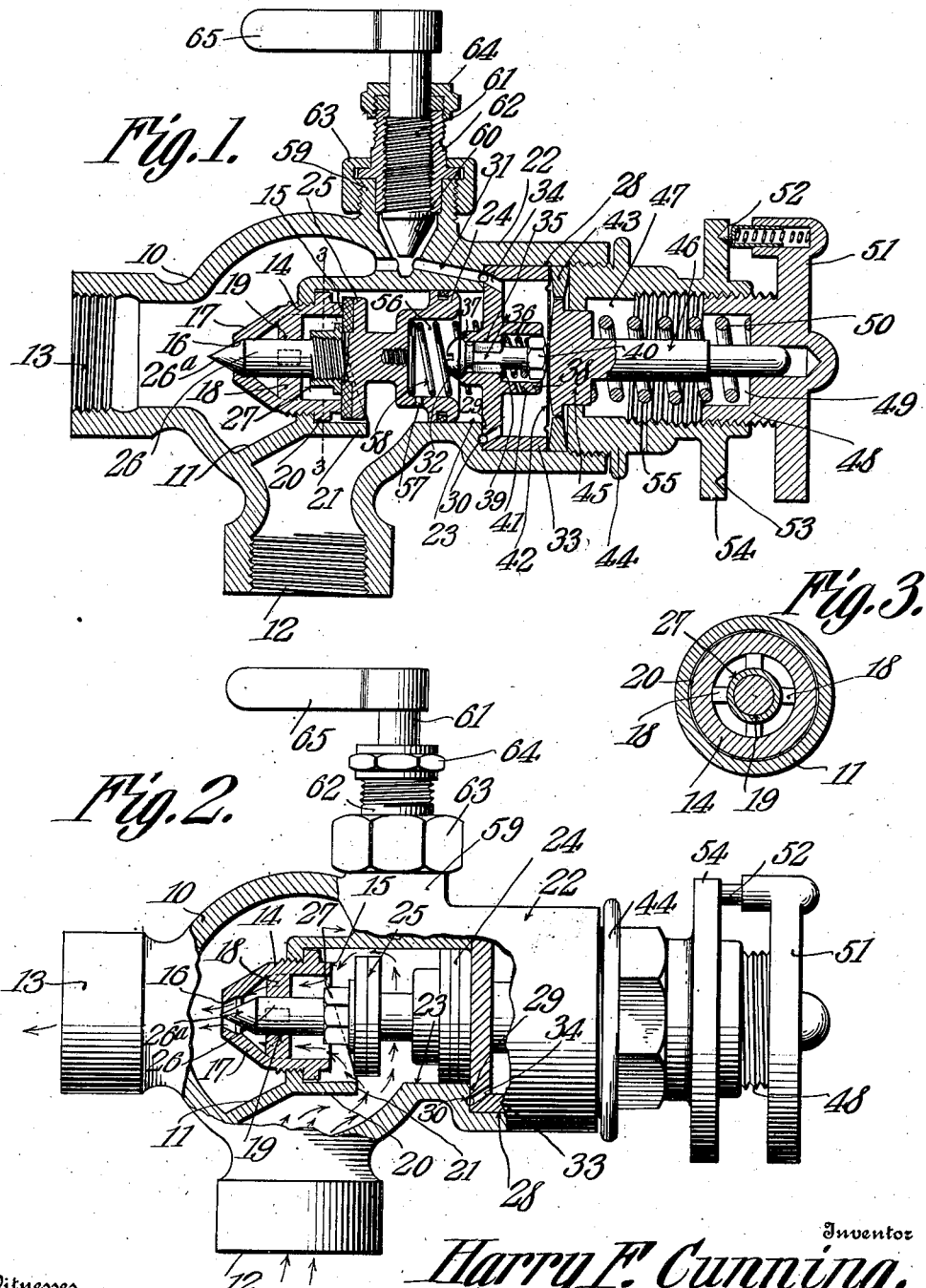
Inventor
Harry F. Cunning.

H. F. CUNNING.
PRESSURE REGULATING VALVE.
APPLICATION FILED FEB. 15, 1909.
937,774.
Patented Oct. 26, 1909.
3 SHEETS—SHEET 2.
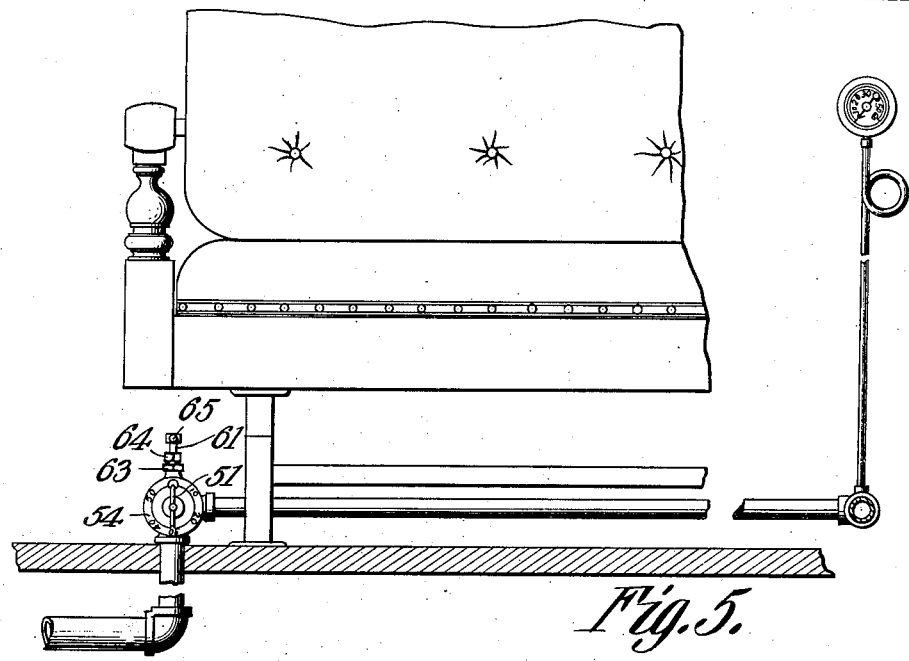
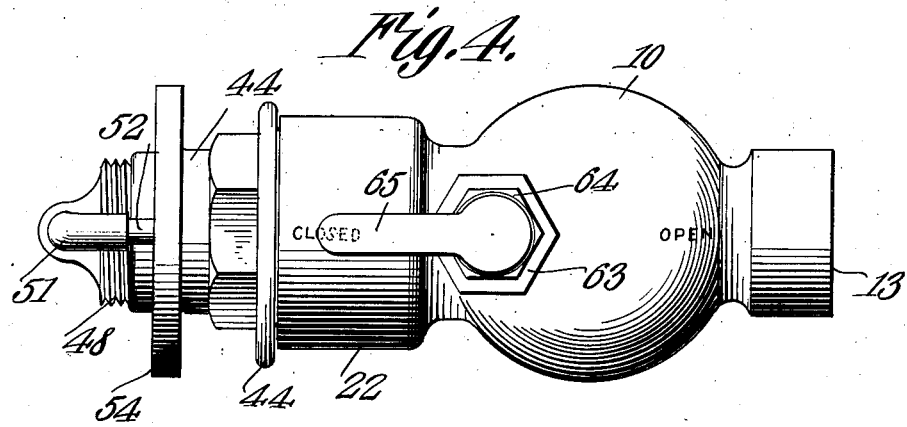
Witnesses
Inventor
Harry F. Cunning.
By C. A. Snow & Co.
Attorneys

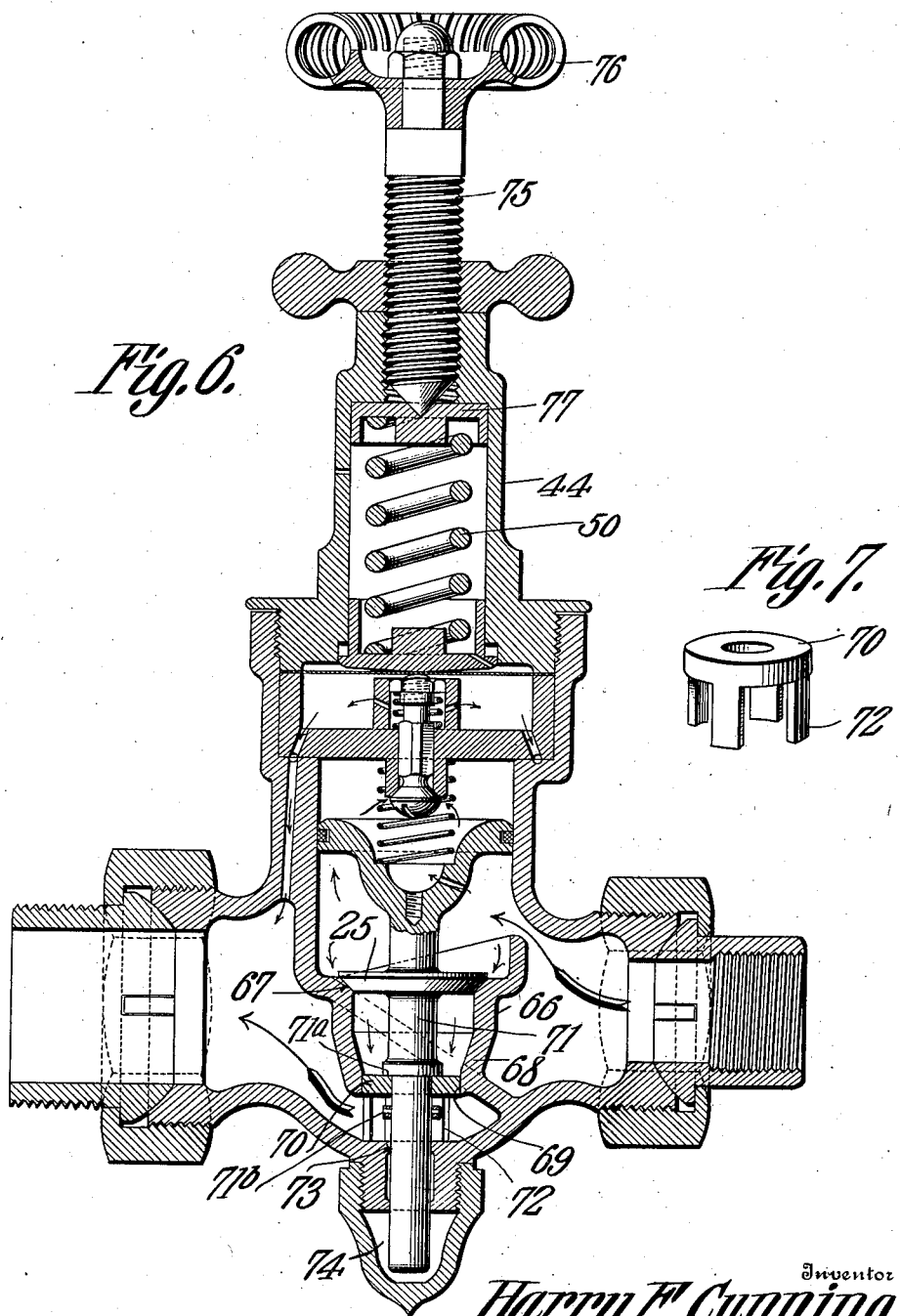

UNITED STATES PATENT OFFICE.

HARRY F. CUNNING, OF ROANOKE, VIRGINIA.

PRESSURE-REGULATING VALVE.

937,774.

Specification of Letters Patent.

Patented Oct. 26, 1909.

Application filed February 15, 1909. Serial No. 478,046.

*To all whom it may concern:*

Be it known that I, HARRY F. CUNNING, a citizen of the United States, residing at Roanoke, in the county of Roanoke and State of Virginia, have invented a new and useful Pressure - Regulating Valve, of which the following is a specification.

The fluid pressure regulating valve, which is the subject of the present application, is designed mainly for use on passenger cars, for regulating the pressure from the main steam train line to the radiating pipes in each car, and to vary the temperature in the car by changing the pressure, the present design to be used intermediate of the main steam train line and the radiating pipes in each car. The valve may also be used for the regulation of water pressure.

The valve is of that type characterized by a main valve and a piston, which are controlled by a small secondary valve, commonly called "auxiliary controlled." In valves of this kind, under certain conditions, the main valve opens and closes very rapidly, producing a hammer effect. This chattering and pounding tends to destroy the valve-seat, and, at the same time, produces a very unpleasant sound. I have also noticed that the steam in passing through the valve, by not striking the piston and the main valve squarely, produces a side thrust which causes the valve to operate irregularly or not at all.

The present invention has for its object to produce a valve which shall not be subject to the herein stated objections, and I not only overcome these objections, but produce a valve which will be unusually sensitive to any slight reduction in the pressure.

The invention also has for its object to provide a valve that can be used for a regulator and a stop-valve combined, so that in regulating the pressure from the main steam train line to the radiating pipe in each car, it will not be necessary to use a stop-valve, as is the general practice now, and the regulator will be the only valve necessary to use intermediate the main steam train line and the heating pipes.

The invention also has for its object to provide improved means for adjusting the valve with a view of changing the temperature according to weather conditions, by raising or lowering the pressure, and also to provide indicators for the adjusting device as well as the stop, in order to simplify matters and avoid confusion among the trainmen or others in charge of the heating apparatus.

The valve may be used for air, or other fluids that a valve of the kind hereindescribed is ordinarily used for.

With the foregoing objects in view, the invention consists in the novel construction and arrangement of parts to be hereinafter described and claimed, reference being had to the drawings hereto annexed in which:—

Figure 1 is a central longitudinal sectional view of the valve; Fig. 2 is a side view partly broken away, showing the parts in another position; Fig. 3 is a section on the line 3—3 of Fig. 1; Fig. 4 is a plan view. Fig. 5 is an elevation showing the application of the invention; Fig. 6 is a central longitudinal sectional view of a modification. Fig. 7 is a perspective view of the valve shown in the preceding view.

Referring more particularly to the drawings, 10 denotes an angle valve casing containing a partition 11, on one side of which is the inlet 12, and on the other side the outlet 13. The partition has a threaded opening into which is screwed a valve-seat comprising a cylinder 14, which is open at both ends and projects from both sides of the partition, and has a valve-seat 15 at the end of that portion which extends into the inlet side of the valve casing, and said valve seat being the end of the cylinder. The open end of the cylinder 14 on the outlet side of the valve casing is indicated at 16, this end of the cylinder being conical, as indicated at 17, and the opening being contracted and having an area which is less than the area of the valve seat 15. Within the cylinder are cross arms 18, having at their junction an opening 19, which serves as a guide for the valve to be presently described. On the inlet side of the valve casing the cylinder 14 has an exterior shoulder 20 which abuts against the partition 11 and assists to hold the cylinder in place. The valve seat 15 is surrounded by a deflecting wall 21, projecting from the partition 11 and formed integral therewith. The purpose of this wall will be presently described, and it may extend entirely around the valve seat, instead of partly, as shown in the drawings.

On the inlet side of the valve casing, opposite the outlet, is an extension 22, in the bore 23 of which a piston 24 works. This piston carries a valve 25, engageable with the seat 15, and a stem 26 having a cone-shaped end 26ª having a working fit in the open end 16 of the cylinder 14. The opening is of such size so as to allow the full diameter of the stem to enter for a short distance when the valve 25 is closed. The stem may be formed integral with the valve 25, and it works in and is guided by the opening 19 heretofore referred to. The valve 25 is faced with a composition disk which is held in place by a nut 27, screwed on the stem 26. The bore 23 has an enlarged portion 28, forming a shoulder 29, in which is a groove 30. A passage 31 extends through the body of the valve casing from the outlet side thereof to the groove 30.

Within the bore 28 is mounted a support for the controlling valve 32. This support is in the form of a cylindrical casing 33 fitting snugly within the bore 28 and against the shoulder 29, that end of the casing fitting against the shoulder being closed, and formed with ports 34 leading to the groove 30. In the closed end of the casing 28 is also a port 35, which is controlled by the valve 32. The stem 36 of this valve works in the port, the outer surface of the valve stem being so shaped that the fluid can pass through the port when the valve 32 is open. The seat 37 of the valve 32 is on that side of the closed end of the casing 28 which is opposite the piston 24. On the opposite side of said end of the casing 28 is an annular flange 38, into which the valve stem 36 extends, and within this flange a spring 39 is coiled around the valve stem, said spring abutting at one end on a nut 40, screwed on the end of the valve stem, and at the other end against the end of the casing 28. The purpose of this spring is to normally hold the valve 32 closed. The nut 40 fits loosely within the flange 38, and in said flange are also ports 41, for a purpose to be presently described.

Extending across the open end of the casing 28 is a metallic diaphragm 42, which is held in place between said end of the casing, and a ring 43, by means of a bonnet 44, screwed into the bore 28 and abutting against said ring. The diaphragm 42 is engageable on one side with the nut 40, and on the other side by the head 45 of a stem 46, working in the bore 47 of the bonnet 44. The outer end of the bore 47 is closed by a screw plug 48, said bore being screw-threaded for this purpose. The inner end of the plug 48 is formed with a depression or recess 49, in which seats one end of a spring 50, coiled around the stem 46, the other end of the said spring abutting against the head 45. The tension of this spring may be regulated by turning the plug 48, said plug carrying an indicator 51, on which is mounted a spring pin 52, which is engageable with notches 53 in a disk 54, formed on the bonnet 44. These notches are indexed to indicate different pressures.

The spring 50 is adjusted to the desired pressure by turning the indicator 51 until the pin 52 drops into the notch 53, indicating said pressure. The bonnet 44 has a leak port 55, to permit the escape of any fluid which may escape past the diaphragm into the bore 47.

On that side of the piston 24 opposite the valve 32, is a chamber 56, and in the wall of said piston, and communicating with said chamber, is an equalizing port 57. Between the floor of this chamber and the end of the casing 33 is interposed a coiled spring 58. The valve casing, adjacent to the port 31 is formed with a bonnet 59, in which works a valve 60, constructed to control the flow through said port. The valve is in the shape of a conical plug adapted to extend across the port and to close the same, said plug being carried by a screw stem 61 working in an interiorly threaded sleeve 62, connected to the bonnet by a coupling nut 63. The sleeve 62 is provided with a packing nut 64, and the stem 61 is fitted with a handle 65.

The operation of the valve is as follows: The steam or other fluid, under pressure, enters the valve casing at 12, and flows in around the deflecting wall 21 into the space under the piston 24. As the area of this piston is greater than that of the valve 25, said piston moves in a direction to open said valve, and the fluid is now free to flow into the outlet 13, the stem 26 moving with the valve 25 and opening the end 16 of the cylinder 14. Any fluid passing the packing ring of the piston 24, and through the equalizing port 57, is free to escape by the valve 32. It will be understood, of course, that this valve is held open by the spring 50 acting on the diaphragm 42, and the latter engaging the nut 40 on the stem 36 of the valve 32. The fluid passing the valve 32 escapes past the nut 40 and the ports 41 into the casing 33, and thence passes through the ports 34 into the passage 31, and to the outlet 13. The diaphragm 42 is controlled by the reduced pressure system on one side, and by the spring 50 on the other side. When sufficient pressure has accumulated in the reduced pressure system to overcome the tension of the spring 50, the diaphragm is forced away from the nut 40, and the valve 32 is then closed by its spring 39. The chamber 56 is then charged to the same pressure through the equalizing port 57 and the leakage past the packing rings of the piston 24, whereupon the pressure becomes the same on both sides of the piston, and the initial pressure on the valve 25 then moving the same to closed position, assisted by the spring 58. When the pressure in the reduced pressure system drops below the predetermined point, the spring 50 pushes the diaphragm in the direction to open the valve 32 which again connects the chamber 56 with the low pressure system. This causes the pressure on that side of the piston to be less than that on the other side, thereby allowing the piston to again move in a direction to open the valve 25, the pressure on the last mentioned side of the piston being the full boiler pressure, while that on the other side is the reduced pressure, the last mentioned side of the piston being connected to the reduced pressure when the valve 32 is open. The valve 60 is provided in order that steam may be shut off the heating pipes without disturbing the adjustment of the reducing valve, and this arrangement also obviates the use of a separate valve for this purpose. For instance, if the regulator is adjusted to deliver ten pounds steam pressure in the heating pipes, and it is desired to cut this pressure off, all that will be necessary will be to move the handle 15 to the position marked "Closed", as shown in Fig. 4 of the drawings. When it is desired to turn the steam on again, the handle is moved to the position marked "Open." This operation of the valve 60 does not disturb the adjustment of the reducing valve.

It will be readily understood that when the valve 60 is closed the pressure will equalize on both sides of the piston 24, and this piston being balanced, the initial pressure will act on the valve 25 and close the same, assisted by the spring 58. The coupling nut 63 is supplied so that the sleeve 62 may be turned around, if desired, to make the handle 65 register correctly with the open or closed positions. The difference between the areas of the piston 24 and the valve 25 is slight, so that the latter is prevented from opening too violently; and this arrangement also tends to keep the valve steady and prevents chattering or pounding. The object of the stem 26 is to cushion the closing movement of the valve 25. The area of the open end 16 of the cylinder 14 is considerably less than that end which is controlled by the valve 25, and the stem 26 stops the flow before the valve 25 seats, thus trapping the steam or other fluid under pressure in the cylinder 14 whereby the valve 25 is balanced and caused to seat gently. The opening 19 in which the stem 26 works, serves to guide the movements of both valves. In practice, the valve 25 moves from its seat just far enough to supply the demand made on the reduced pressure system, and remains in that position until the amount of steam needed is increased or diminished, or, in other words, the valve adjusts itself to the demands made on it to the maximum capacity of the valve.

Fig. 5 shows the invention applied to a passenger train heating system. The valve is shown located close to a passenger's seat, so that the train man may open or close the same, and also regulate the temperature according to weather conditions, by raising or lowering the pressure, the former being accomplished by turning the handle 65, and the latter by turning the indicator 51. As the open and closed positions and the pressures are plainly marked, it will greatly simplify matters and avoid confusion.

While I have described the invention in connection with a car-heating system, it will be understood that the valve may be used between water-mains and dwellings, and other buildings, where it is desirable to have a lower pressure than in the main, and also to use the same on fire hose, where excessive pressure is used for fire purposes, to prevent injury of the building by the force of the water. The invention may be used in any fluid pressure system where a reduction of the initial pressure is necessary or desired. If desired, the shut-off 60 may be dispensed with if not needed or desired, and the valve may be a cross-valve, or designed in any other shape.

It will be seen, from the foregoing, that I have provided a valve which is efficient and reliable in action, and very sensitive in responding to slight reductions of pressure. There are no complicated parts to get out of order, and all parts are readily accessible for repairs. By the deflecting wall 21 the fluid is caused to strike the piston 24 and valve 25 centrally, whereby a side thrust thereon is prevented, which would cause said parts to operate irregularly or not at all. The cushioning of the valve 25 prevents pounding and chattering, and the resulting undue wear of the valve and its seat.

In the modification illustrated in Fig. 6 the means for cushioning the closing movement of the valve 25 is slightly different, and the means for adjusting the tension of the diaphragm spring 50 is also slightly different, the indicating device being dispensed with. I have also shown the valve without the shut-off 60, although the same may be added if desired.

In the modified form of valve referred to, the partition 11 is formed with a cylindrical chamber 66, which is open at both ends. As in the first instance, the open end of the chamber on the inlet side of the valve casing is formed with a seat 67 for the valve 25, and at the opposite end the chamber tapers, as indicated at 68, so that its end which opens to the outlet side of the valve casing has an area which is less than the area of the valve seat 67. This contracted end of the chamber is indicated at 69, and in said opening operates, at a smooth working fit, a disk valve 70 which is loosely mounted on a stem 71 depending from the valve 25, and slidable on said stem between a shoulder 71ª and a collar 71ᵇ thereon. From the valve 70 depend guide wings 72 which are of such a length as to engage the floor of the valve casing when said valve is in closed position, and in this position the valve has its upper face in engagement with the shoulder 71ª, and its lower face spaced from the collar 71ᵇ. The pressure on the valve also holds it against the shoulder. Inasmuch as the valve 70 is loose on the stem, it will be seen that it remains seated in the end 69 of the chamber 66 until the valve 25 has raised off its seat a distance equal to the distance between the lower face of the valve 70 and the collar 71ᵇ, and the opening movement of the valve 70 takes place when the said collar engages the lower face thereof. The valve 70 seats in advance of the valve 25, thus trapping the steam or other fluid under pressure in the chamber 66, and causing the valve 25 to be balanced, and to seat gently. The stem 71 also extends through an opening 73 in the valve casing, and into a chamber 74 connected to said casing. When the valve 25 is open, this chamber fills with condensed steam, thereby offering resistance to the stem 71 when it moves downwardly, and thus also serving to cushion the same. The diaphragm spring 50 is adjustable by a screw stem 75, which is threaded into the bonnet 44, said screw stem being provided with a hand wheel 76. The screw stem bears against a block 77, working in the bore of the bonnet, and engageable t one end of the spring 50.

Except as herein described, ie modified form of valve operates as the fi.st described one.

What is claimed is:—

1. In a valve, a casing; a chamber therein opening at its ends into the inlet and into the outlet sides of the casing, respectively, the inlet end of the chamber having a greater area than the outlet end; a valve seating on the inlet end of the chamber; a stem depending from said valve, abutments on the stem; and a valve slidably mounted on said stem between the abutments, and working in the outlet end of the chamber.

2. In a valve, a casing; a chamber therein opening at its ends into the inlet and into the outlet sides of the casing, respectively, the inlet end of the chamber having a greater area than the outlet end; a valve seating on the inlet end of the chamber; a stem depending from said valve; abutments on the stem; a valve slidably mounted on said stem between the abutments, and working in the outlet end of the chamber; and guide wings depending from the last-mentioned valve, and engaging the floor of the valve casing when said valve is in closed position.

3. In a pressure-regulating valve, a casing having an inlet, an outlet, and a by-pass leading to the outlet; a valve between the inlet and the outlet; an extension on the casing having a shouldered bore, said shoulder having a groove from which the by-pass leads; a piston operatively connected to the valve, and having an equalizing port, the area of the piston being greater than that of the valve; a casing mounted in the aforesaid bore, and closed at one end, said end seating on the shoulder of the bore, and having a port; an auxiliary valve controlling said port; and said end of the casing also having ports leading to the groove of the shoulder; a diaphragm extending across the other end of the last-mentioned casing; a bonnet entering the bore, and clamping the diaphragm in place, said diaphragm being engageable with the auxiliary valve to hold the same open; and means for closing the auxiliary valve when the same is released by the diaphragm.

4. In a pressure-regulating valve, a casing having an inlet, an outlet, and a by-pass leading to the outlet; a valve between the inlet and outlet; an extension on the casing having a shouldered bore, said shoulder having a groove from which the by-pass leads; a piston operatively connected to the valve, and having an equalizing port, the area of the piston being greater than that of the valve; a casing mounted in the aforesaid bore, and closed at one end, said end seating on the shoulder of the bore, and having a port; an auxiliary valve controlling said port, and said end of the casing also having ports leading to the groove of the shoulder; a diaphragm extending across the last-mentioned casing, and engageable with the auxiliary valve to hold the same open; and means for closing the auxiliary valve when said valve is released by the diaphragm.

5. In a pressure-regulating valve, a casing containing a main valve, and an auxiliary valve; a diaphragm for operating the auxiliary valve; a stem having a head engageable with the diaphragm; a bonnet connected to the casing, and having a threaded bore into which the aforesaid stem extends; a plug screwed into the bonnet; a spring coiled around the stem between the plug and the head of the stem; an indicator carried by the plug; a disk on the bonnet having indexed notches; and a locking-pin carried by the indicator, and engageable with the aforesaid notches.

In testimony that I claim the foregoing as my own, I have hereto affixed my signature in the presence of two witnesses.

HARRY F. CUNNING.

Witnesses:
GRACE HORNBROOK,
HORACE WILCOX.